(12) United States Patent
Jiao et al.

(10) Patent No.: US 11,751,297 B2
(45) Date of Patent: Sep. 5, 2023

(54) RADIO FREQUENCY HEATING METHOD AND RADIO FREQUENCY HEATING DEVICE

(71) Applicant: Shanghai Ocean University, Shanghai (CN)

(72) Inventors: Yang Jiao, Shanghai (CN); Feng Li, Shanghai (CN)

(73) Assignee: Shanghai Ocean University, Shanghai (CN)

( * ) Notice: Subject to any disclaimer, the term of this patent is extended or adjusted under 35 U.S.C. 154(b) by 812 days.

(21) Appl. No.: 16/804,363

(22) Filed: Feb. 28, 2020

(65) Prior Publication Data
US 2020/0205249 A1  Jun. 25, 2020

Related U.S. Application Data

(63) Continuation of application No. PCT/CN2018/103785, filed on Sep. 3, 2018.

(30) Foreign Application Priority Data

Sep. 11, 2017 (CN) .......................... 201710812218.0
Sep. 11, 2017 (CN) .......................... 201710812957.X

(51) Int. Cl.
H05B 6/80 (2006.01)
H05B 6/64 (2006.01)

(52) U.S. Cl.
CPC ........... *H05B 6/802* (2013.01); *H05B 6/6447* (2013.01)

(58) Field of Classification Search
CPC ......... A23L 3/365; H05B 6/62; H05B 6/6447; H05B 6/802

USPC ....... 219/689, 692, 702, 704, 710, 711, 712, 219/713, 730, 759, 770
See application file for complete search history.

(56) References Cited

U.S. PATENT DOCUMENTS

2007/0235447 A1* 10/2007 Cheung .................. H05B 6/802
219/678

FOREIGN PATENT DOCUMENTS

| CN | 1545823 A | 11/2004 |
|----|-----------|---------|
| CN | 201308614 Y * | 9/2009 |
| CN | 203407485 U | 1/2014 |
| CN | 103919237 A | 7/2014 |

(Continued)

OTHER PUBLICATIONS

Chen et al., Food Processing, Aug. 2012, pp. 133, 166 and 167, Harbin Institute of Technology Press, Harbin, China.

(Continued)

*Primary Examiner* — Quang T Van
(74) *Attorney, Agent, or Firm* — Westbridge IP LLC

(57) ABSTRACT

A radio frequency heating method includes: cladding an object to be heated by using a surrounding medium, and performing radio frequency heating operation on the object to be heated clad by the surrounding medium, in which the surrounding medium is an alcoholic solution. In the radio frequency heating method according to the embodiments of the present application, by using the alcoholic solution as the surrounding medium to clad the object to be heated, heating uniformity of the object to be heated in a radio frequency heating process may be improved, edge corner energy concentration effect in the radio frequency heating process may be fully avoided, and then quality of the object to be heated after heating may be ensured.

18 Claims, 5 Drawing Sheets

(56) References Cited

FOREIGN PATENT DOCUMENTS

| | | | |
|---|---|---|---|
| CN | 104273206 A | 1/2015 | |
| CN | 105124713 A | 12/2015 | |
| CN | 105940266 A | 9/2016 | |
| CN | 106615030 A | 5/2017 | |
| CN | 107373296 A | 11/2017 | |
| CN | 107373297 A | 11/2017 | |
| GB | 2465542 A | 5/2010 | |
| JP | S5534044 A | 3/1980 | |
| JP | S58101671 A | 6/1983 | |
| JP | 01105159 A * | 4/1989 | ............... A01N 1/00 |
| JP | 2003332037 A | 11/2003 | |
| KR | 20120034904 A * | 4/2012 | |

OTHER PUBLICATIONS

First Office Action in counterpart Chinese Application 201710812218.0, dated Mar. 26, 2019.
First Office Action in counterpart Chinese Application 201710812957.X, dated Apr. 15, 2019.
International Search Report in corresponding PCT Application PCT/CN2018/103785, dated Nov. 1, 2018.
Written Opinion in corresponding PCT Application PCT/CN2018/103785, dated Nov. 1, 2018.

* cited by examiner

RADIO FREQUENCY HEATING METHOD AND RADIO FREQUENCY HEATING DEVICE

CROSS-REFERENCE TO RELATED APPLICATIONS

The present application is a continuation of International Application No. PCT/CN2018/103785, filed on Sep. 3, 2018, which claims priority to Chinese Patent Application No. 201710812957.X, filed on Sep. 11, 2017 and Chinese Patent Application No. 201710812218.0, filed on Sep. 1, 2017. All applications are incorporated herein by reference in their entireties.

TECHNICAL FIELD

Embodiments of the present application relate to the field of material processing technologies, in particular to a radio frequency heating method and a radio frequency heating device.

BACKGROUND

With the improvement of people's living standards, the import and export volume of food such as livestock products and aquatic products are also increasing. In order to ensure freshness of food, frozen transportation is often used, and thawing, segmenting and even a further processing operation are carried out on food after the frozen transportation is completed. At present, traditional thawing methods include an air thawing method and a water thawing method. In the traditional thawing methods, if a temperature of an external heat source is too low, a thawing will be too slow and a long time will be taken, which will lead to rapid reproductions of microorganisms; and if the temperature of the external heat source is too high, it will lead to deterioration of food quality.

A radio frequency wave refers to an electromagnetic wave from 1 MHz to 300 MHz. By using the radio frequency wave to stimulate microscopic particles such as ions, atoms and molecules in food to vibrate or rotate, the temperature of food may be rapidly increased, so as to achieve rapid heating. Radio frequency heating is suitable for most food thermal processing fields such as drying, thawing, sterilizing, killing insect and killing enzyme of food. In addition, a defect of low heating speed caused by the traditional outside-to-inside heating methods may be avoided.

As an emerging thawing method, a radio frequency thawing technology has many advantages, such as high thawing speed (10 minutes to 20 minutes), good thawing uniformity, and so on. However, in a process of radio frequency thawing, since a temperature of frozen food may be increased gradually, dielectric loss of frozen food may be increased with the increase of the temperature. And then radio frequency energy absorbed by frozen food may be increased due to the increased dielectric loss. Therefore, if a temperature of a local area of frozen food is high, radio frequency energy may be concentrated in the local area to cause a local overheating phenomenon of frozen food, resulting an edge corner energy concentration effect. In other words, when two or more surfaces intersect at a certain angle, electric field energy may be concentrated at edge corners of the intersection, resulting in heating rates at the edge corners being much higher than that at central parts. Therefore, the thawing uniformity of frozen food thawed by using the existing radio frequency thawing technology is poor.

SUMMARY

In view of this, a radio frequency heating method and a radio frequency heating device are provided by the present application, so as to solve a problem that existing radio frequency heating methods may not eliminate edge corner energy concentration effect in a heating process to result in poor heating uniformity.

According to a first aspect, a radio frequency heating method according to an embodiment of the present application includes: cladding an object to be heated by using a surrounding medium, and performing a radio frequency heating operation on the object to be heated clad by the surrounding medium. The surrounding medium is an alcoholic solution.

In an embodiment of the present application, before the cladding an object to be heated by using a surrounding medium, the method further includes: cooling the surrounding medium to a preset temperature. A difference between the preset temperature and a temperature of the object to be heated is within a preset range.

In an embodiment of the present application, the cladding an object to be heated by using a surrounding medium includes: pouring the surrounding medium into a medium container, and putting the object to be heated into the medium container, so that the object to be heated is clad by the surrounding medium.

In an embodiment of the present application, the performing a radio frequency heating operation on the object to be heated clad by the surrounding medium includes: performing a heating operation, by a radio frequency heater, on the medium container containing the object to be heated and the surrounding medium.

In an embodiment of the present application, a heating rate of the surrounding medium is lower than a heating rate of the object to be heated.

In an embodiment of the present application, the surrounding medium is an ethanol solution.

In an embodiment of the present application, a concentration of the ethanol solution is more than 40%.

In an embodiment of the present application, the surrounding medium is a glycerol solution.

In an embodiment of the present application, a concentration range of the glycerol solution is between 50% and 80%.

In an embodiment of the present application, a concentration of the glycerol solution is 70%.

According to a second aspect, a radio frequency heating device according to an embodiment of the present application includes a medium container containing a surrounding medium configured to clad an object to be heated and a radio frequency heater configured to heat the medium container by radio frequency. The surrounding medium is an alcoholic solution.

In an embodiment of the present application, the radio frequency heating device further includes a heat exchanger connected with the medium container. The heat exchanger is configured to perform a temperature control cycling on the surrounding medium in the medium container.

In an embodiment of the present application, the heat exchanger includes a temperature feedback system. The temperature feedback system is configured to monitor temperature data of the surrounding medium and feed the temperature data back to the heat exchanger.

In an embodiment of the present application, the medium container includes a liquid level sensor. The liquid level sensor, located on an inner wall of the medium container, is configured to monitor a cladding situation of the surrounding medium on the object to be heated.

In an embodiment of the present application, the medium container further includes a liquid injector signalling connected with the liquid level sensor. The liquid injector is configured to inject the surrounding medium into the medium container and control an injecting amount of the surrounding medium according to monitoring data of the liquid level sensor.

In an embodiment of the present application, the surrounding medium is an ethanol solution.

In an embodiment of the present application, a concentration of the ethanol solution is more than 40%.

In an embodiment of the present application, the surrounding medium is a glycerol solution.

In an embodiment of the present application, a concentration range of the glycerol solution is between 50% and 80%.

In an embodiment of the present application, a concentration of the glycerol solution is 70%.

In the radio frequency heating method according to the embodiments of the present application, by means of using the alcoholic solution as the surrounding medium to clad the object to be heated, heating uniformity of the object to be heated in a radio frequency heating process may be improved, the edge corner energy concentration effect in the radio frequency heating process may be fully avoided, and then the quality of the object to be heated after heating may be ensured. In particular, when the object to be heated refers to food to be thawed, the quality of the food to be thawed after thawing may be improved by using the radio frequency heating method according to the embodiments of the present application. Not only may the edge corner energy concentration effect in regular food be overcome, but also a problem of uneven electromagnetic field distribution caused by uneven thickness of irregular food may be solved, thereby non-uniform heating to the irregular food may be avoided.

In the radio frequency heating device according to the embodiments of the present application, by means of putting the object to be heated into the medium container containing with the surrounding medium, the object to be heated is surrounded by the surrounding medium. Thereby heating uniformity of the object to be heated is improved, and quality, after heating, of the object to be heated is ensured.

In addition, when the radio frequency heating method and the radio frequency heating device according to the embodiments of the present application are applied to a thawing process of frozen food and the glycerol solution is used as the surrounding medium, the thawing uniformity of the food to be thawed may be further improved, and the quality of the food after thawing may be fully ensured.

DETAILED DESCRIPTION OF THE EMBODIMENTS

In order to further clarify objects, technical means and advantages of the present application, the present application is further described in detail below with reference to accompany drawings.

Figure 1:
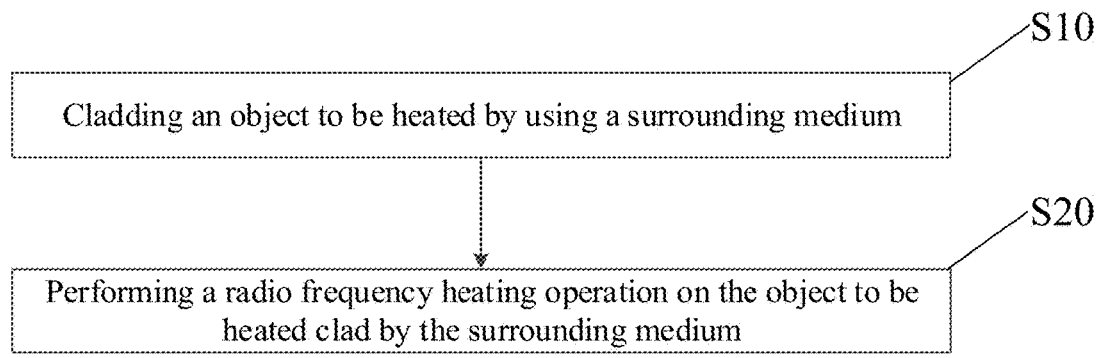
FIG. 1 shows a schematic flowchart of a radio frequency heating method according to an embodiment of the present application.

FIG. 1 shows a schematic flowchart of a radio frequency heating method according to an embodiment of the present application. As shown in FIG. 1, the radio frequency heating method according to the embodiment of the present application includes the following steps.

Step S10: cladding an object to be heated by using a surrounding medium.

Step S20: performing a radio frequency heating operation on the object to be heated clad by the surrounding medium.

It may be noted that the heating operation on the object to be heated by using radio frequency wave includes, but is not limited to, a thermal processing operation, such as drying, thawing, sterilizing, killing insect and killing enzyme, on the object to be heated. For example, the object to be heated includes food that needs to be thawed, such as frozen beef.

Since the object to be heated may be better clad by a liquid surrounding medium, heating uniformity of the object to be heated may be further improved by using the liquid surrounding medium. In particular, in an embodiment of the present application, an alcoholic solution may be selected as the surrounding medium. In alcoholic solutions, an ethanol solution may be selected, and a glycerol solution may be more preferably selected.

The ethanol solution and the glycerol solution are polar solvents having extremely low dielectric loss in radio frequency band, thus they may not be heated by using radio frequency wave. Moreover, the liquid ethanol solution and the liquid glycerol solution have good contact with the object to be heated. In a heating process, the object to be heated may be well isolated from air by using the ethanol solution or the glycerol solution, thereby an edge corner energy concentration effect in the object to be heated may be alleviated or even avoided. In addition, excess energy at edge corners of the object to be heated may be absorbed by the low-temperature ethanol solution or the low-temperature glycerol solution, so that energy waste can be minimized, and heating temperature distribution may be further homogenized for industrial production.

A concentration of the ethanol solution may be more than 40%. A concentration range of the glycerol solution may be between 50% and 80%. Since a freezing point of the ethanol solution with the concentration of more than 40% and that of the glycerol solution with the concentration range between 50% and 80% are below −20° C., the ethanol solution and the glycerol solution may maintain liquid form during a process of heating a frozen object to be heated above −20° C. Therefore, good contact between the surrounding medium and the object to be heated may be ensured.

In the following, a surrounding medium radio frequency heating experiment, a sample radio frequency thawing experiment and a thawing sample quality analysis experiment are used to prove advantages of using the ethanol solution or the glycerol solution as the surrounding medium in a sample radio frequency thawing process.

From a perspective of dielectric properties of the surrounding mediums, a loss tangent of pure water ice is lower than that of an ethanol solution (95% concentration) and that of a glycerol solution (70% concentration). Since the loss tangent is directly proportional to a heating rate, the pure water ice is more suitable as the surrounding medium in the radio frequency heating method theoretically. However, the pure water ice, which is solid, is not feasible for experiment. It can be seen from the following experiments that crushed ice has no significant effect as the surrounding medium. In fact, the ethanol solution and the glycerol solution are more suitable as the surrounding mediums.

Firstly, the inventors tested heating rates of three kinds of surrounding mediums, namely the pure water ice, the ethanol solution (95%) and the glycerol solution (70%), in the radio frequency heating process by using the surrounding medium radio frequency heating experiment. In the surrounding medium radio frequency heating experiment, the three kinds of surrounding mediums were respectively heated by radio frequency for 5 minutes. And then heating characteristics of the three kinds of surrounding mediums were compared to obtain an experimental result and analysis contents described below.

Figure 2:
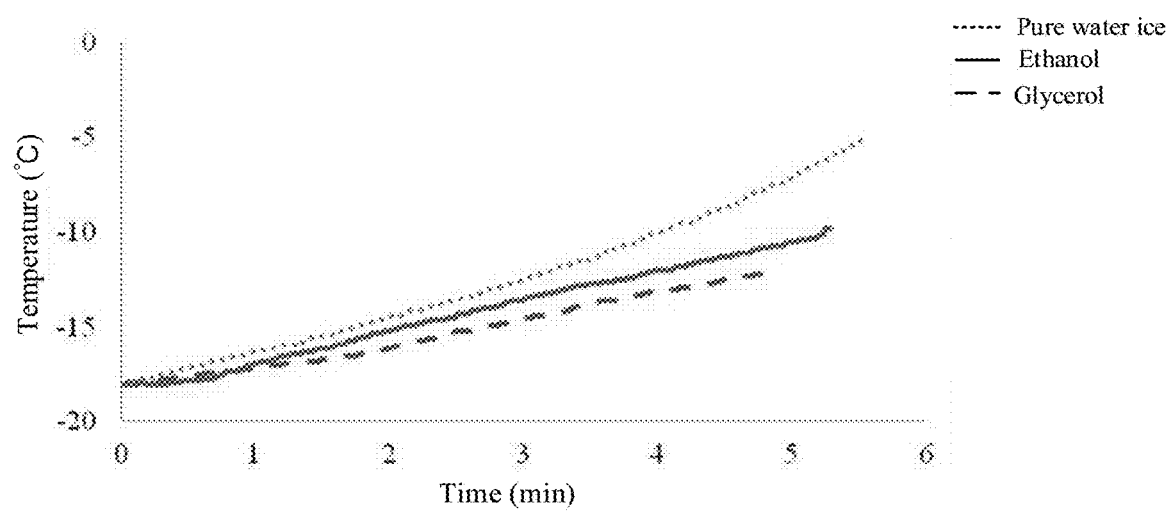
FIG. 2 shows a schematic diagram of heating curves of surrounding mediums during a radio frequency heating process in a surrounding medium radio frequency heating experiment.

FIG. 2 shows a schematic diagram of heating curves of surrounding mediums during a radio frequency heating process in a surrounding medium radio frequency heating experiment. As shown in FIG. 2, after heating for 5 minutes similarly, the heating rate of the pure water ice is the highest, and a temperature of the pure water ice reaches −7.5° C.; the heating rate of the ethanol solution is the secondly highest, and a temperature of the ethanol solution reaches −10.8° C.; and the heating rate of the glycerol solution is the lowest, and a temperature of the glycerol solution raises from −20° C. to about −12° C. A reason why the pure water ice, namely the crushed ice, has a high heating rate is that air exists between ice particles, and a dielectric property of the ice particles is greatly different from a dielectric property of air.

It may be noted that if the heating rate of the surrounding medium is low, part of heat on a surface of the sample may be carried away, and the sample may be isolated from air. Therefore, the edge corner energy concentration effect of the sample may be effectively alleviated, and thawing uniformity of the sample may be improved. In addition, from a perspective of industrialization of radio frequency heating, the low heating rate of the surrounding medium may also save energy required for circulating cooling of the surrounding medium, thereby the surrounding medium may be continuously recycled.

Therefore, the pure water ice has the high heating rate due to an influence of its own particle characteristic, and has no ability to improve thawing uniformity of radio frequency. In contrast, the ethanol solution and the glycerol solution have the ability to improve the thawing uniformity of radio frequency due to the low heating rates.

Next, the sample radio frequency thawing experiment was used to test heating rates of samples under four radio frequency thawing modes: a radio frequency thawing without surrounding medium, a radio frequency thawing with the pure water ice, a radio frequency thawing with the ethanol solution and a radio frequency thawing with the glycerol solution. In the sample radio frequency thawing experiment, two shapes of beef samples (cuboid samples and step body samples) were frozen at −20° C., removed for drilling, and placed respectively in three kinds of surrounding mediums at −20° C., namely the pure water ice, the ethanol solutions (95%) and the glycerol solution (70%). Peripheries of the samples were uniformly covered by the surrounding mediums, and the peripheries of the samples, covered by the surrounding mediums, were heated by using radio frequency.

Figure 3A:
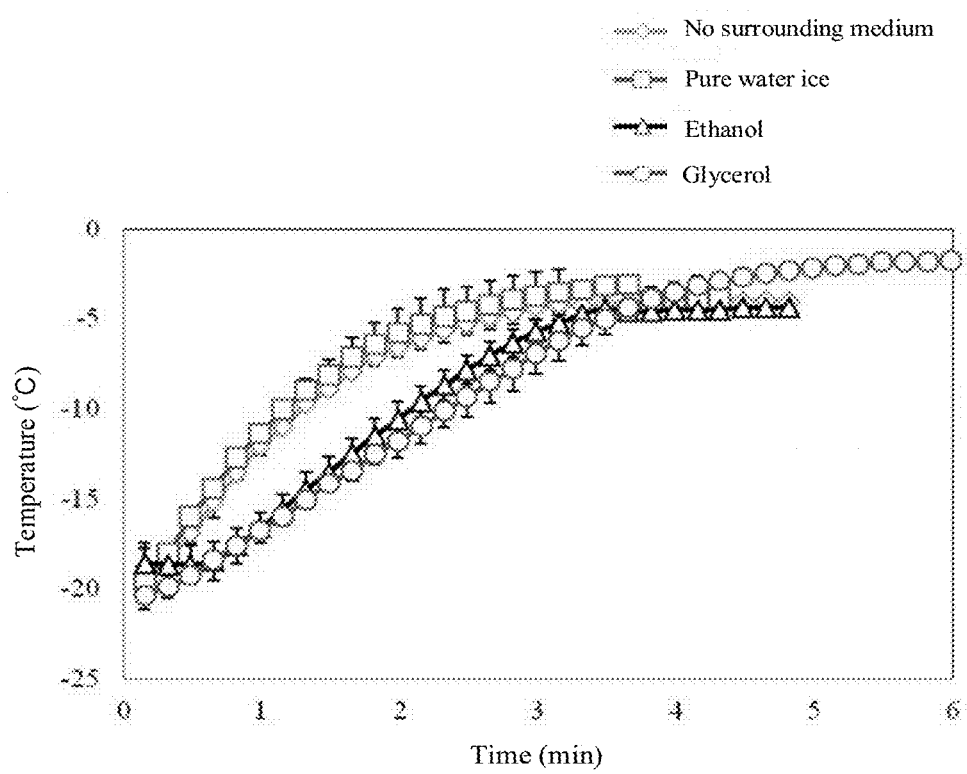
FIG. 3a and FIG. 3b show schematic diagrams of heating curves of samples to be thawed during a radio frequency thawing process in a sample radio frequency thawing experiment.
Figure 3B:
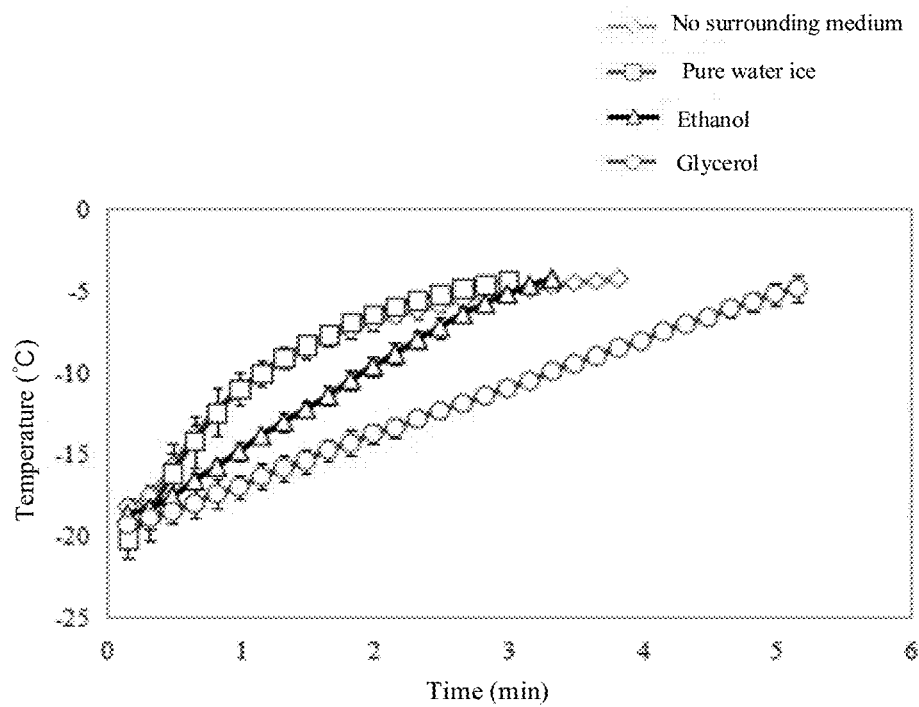

FIG. 3a and FIG. 3b show schematic diagrams of heating curves of samples to be thawed during a radio frequency thawing process in a sample radio frequency thawing experiment. Specifically, FIG. 3a shows a schematic diagram of heating curves of cuboid samples during a radio frequency thawing process. FIG. 3b shows a schematic diagram of heating curves of step body samples during a radio frequency thawing process. It is noted that in the sample radio frequency thawing experiment, a center point of each of the cuboid samples was taken as a measuring point, and a thickness center point of each of the step body samples was taken as the measuring point.

As shown in FIG. 3a and FIG. 3b, various surrounding mediums have significant influences on the heating rates of the samples. Specifically, for the cuboid samples, the heating rate of the sample without surrounding medium is basically the same as that of the sample with the pure water ice, namely the crushed ice, as the surrounding medium. That is, the pure water ice has no significant effect on the heating rate of the sample. The heating rate of the sample is significantly decreased when the ethanol solution or the glycerol solution is used as the surrounding medium. For the step body samples, the heating rate of the sample without surrounding medium is still the same as that of the sample with the pure water ice as the surrounding medium. The heating rate of the sample with the ethanol solution as the surrounding medium is decreased. The heating rate of the sample with the glycerol solution as the surrounding medium is the lowest.

The heating rate of samples is inversely proportional to the thawing uniformity. That is to say, the higher the heating rate of the sample is, the worse the thawing uniformity is. On the contrary, the slower the heating rate of the sample is, the better the thawing uniformity is. Therefore, based on heating rate data of each of the surrounding mediums in the radio frequency thawing process, it can be seen that, compared with the pure water ice, the ethanol solution and the glycerol solution are more suitable to be used as the surrounding mediums. In addition, the glycerol solution is an optimal surrounding medium.

Table 1 shows an extreme temperature table of samples with different surrounding mediums after radio frequency thawing.

TABLE 1

| Thawing mode | Extreme temperature of cuboid sample (° C.) | | | | Extreme temperature of step body sample (° C.) | | | |
|---|---|---|---|---|---|---|---|---|
| | Transverse section of middle layer | | Side surface | | Upper surface | | Longitudinal section | |
| | Highest | Lowest | Highest | Lowest | Highest | Lowest | Highest | Lowest |
| Radio frequency without surrounding medium | 17.6 | −8.2 | 37.3 | −3.4 | 42.0 | −5.2 | 3.4 | −6.7 |
| Radio frequency with pure water ice | 21.7 | −6.7 | 32.4 | −3.3 | 16.4 | −8.3 | 12.6 | −7.6 |
| Radio frequency with ethanol solution | −2.8 | −12.0 | −5.5 | −13.3 | −7.3 | −11.1 | −5.1 | −11.6 |
| Radio frequency with glycerol solution | −2.7 | −12.4 | −2.5 | −14.0 | −5.5 | −10.7 | −3.7 | −5.3 |

Table 1 shows extreme temperature data of the cuboid samples and the step body samples under four different radio frequency thawing modes, i.e., the radio frequency thawing without surrounding medium, the radio frequency thawing with the pure water ice, the radio frequency thawing with the ethanol solution and the radio frequency thawing with the glycerol solution. Here, the extreme temperature data of each of the cuboid samples includes extreme temperatures of areas of a transverse section of a middle layer and a side surface. The extreme temperature data of each of the step body samples includes extreme temperatures of areas of an upper surface and a longitudinal section.

According to actual experimental conditions and the extreme temperature data of the cuboid samples in Table 1, it can be seen that when the cuboid samples are thawed by the radio frequency thawing mode without surrounding medium, the edge corner energy concentration effect occurs on the cuboid samples, and may be clearly confirmed by temperature distribution on the side surfaces. When the cuboid samples are thawed by the radio frequency mode with the pure water ice as the surrounding medium, the edge corner energy concentration effect on the cuboid samples is not alleviated. According to the actual experimental conditions and the extreme temperature data of the cuboid samples in Table 1, it can be seen that when the cuboid samples are thawed by the radio frequency thawing mode with the ethanol solution or the glycerol solution as the surrounding medium, the edge corner energy concentration effect may be alleviated obviously, and a super cooling region is formed around each of the cuboid samples. A temperature of the super cooling region is about −12° C. to −14° C., and the super cooling region exists at only 1 cm from the cuboid sample. Except for the super cooling region, an overall temperature of the cuboid sample is about −2.8° C. Therefore, the supercooling region has no significant influence on subsequent operations such as sample cutting.

A reason for forming the supercooling region is that the ethanol solution and the glycerol solution absorb less heat during the radio frequency heating process, so that the temperatures of the ethanol solution and the glycerol solution rise slowly, thus contact surfaces of the cuboid sample are cooled.

In an embodiment of the present application, forming the supercooling region is avoided by means of appropriately raising the temperature of the surrounding medium, thereby temperature uniformity of the sample may be further improved.

Similarly, according to the actual experimental conditions and the extreme temperature data of the step body samples in Table 1, it can be seen that when the step body samples are thawed by the radio frequency thawing mode without surrounding medium, the edge corner energy concentration effect also occurs on the step body samples. When the step body samples are thawed by the radio frequency thawing mode with the pure water ice as the surrounding medium, the edge corner energy concentration effect on step body samples is not alleviated.

According to the actual experimental conditions and the extreme temperature data of the step body samples in Table 1, it can be seen that when the step body samples are thawed by the radio frequency thawing mode with the ethanol solution or the glycerol solution as the surrounding medium, the edge corner energy concentration effect may be alleviated obviously. Specifically, when there is no surrounding medium, internal temperature distribution of the step body sample is relatively uniform, and the highest temperature is only 3.4° C. When the pure water ice is used as the surrounding medium, the highest edge corner temperature of the step body sample rises to 12.6° C. When the ethanol solution is used as the surrounding medium, an internal temperature of the step body sample is about −5.1° C., and a surface temperature of the step body sample is about −11.6° C. (namely the supercooling region). However, the supercooling region is small and an overall temperature distribution is relatively uniform. When the glycerol solution is used as the surrounding medium, the effect of alleviating the edge corner energy concentration effect is the best. A temperature difference between the highest extreme temperature and the lowest extreme temperature of the step body sample is only 1.6° C.

Therefore, although the pure water ice is the most suitable surrounding medium from the perspective of dielectric property, an effect of the pure water ice on improving the radio frequency thawing uniformity of the sample is not ideal. According to the actual experimental conditions and Table 1 (namely according to the extreme temperature data of the samples after thawing), it can be seen that the ethanol solution and the glycerol solution are both good surrounding mediums, and the glycerol solution is the optimal surrounding medium.

It may be noted that when the pure water ice is used as the surrounding medium, an overheating phenomenon of the sample occurs due to gaps between the ice particles. The gaps may prevent the ice particles from contacting with the sample closely, so that the thawing uniformity of the sample is poor. Furthermore, the pure water ice near the edge corners of the sample may melt into pure water due to temperature rise at the edge corners of the sample. Since the dielectric loss of the pure water is much higher than that of the pure water ice, a thermal escape effect may be occurred, and then the thawing uniformity of the sample may be further deteriorated. Accordingly, it can be seen that the thawing uniformity of the radio frequency thawing may not be improved by means of using the pure water ice as the surrounding medium.

Based on the above surrounding medium radio frequency heating experiment and the sample radio frequency thawing experiment, it can be seen that the edge corner energy concentration effect of the object to be heated may be effectively alleviated by means of using the ethanol solution or the glycerol solution as the surrounding medium. Thus, quality of the object to be heated after heating may be fully ensured, and a problem that radio frequency heating energy may be distributed unevenly in the object to be heated by using the existing radio frequency heating method may be solved.

In particular, according to the following thawing sample quality analysis experiment, the present inventors discovered that the quality of the thawing sample may be fully ensured by using the glycerol solution. Therefore, the glycerol solution is more suitable to be used as the surrounding medium.

Specifically, in the thawing sample quality analysis experiment, in each of the four radio frequency thawing modes, 100 g of the cuboid sample and 100 g of the step body sample were taken and uniformly stirred respectively. Sampling positions of each of the cuboid samples include a positive center (i.e. center) and four corners (i.e. edge corners) of the sample. Sampling positions of each of the step body samples include a center of a thick part (i.e. center) and steps (i.e. edge corners). Then quality of the samples was compared respectively from four aspects, namely drip loss rate, cooking loss, total volatile basic nitrogen (TVB-N) and color. Experimental results and analysis described below were concluded according to comparison results.

By analyzing drip loss rate data of the cuboid samples after thawing, it can be seen that a drip loss rate of the radio frequency thawing mode without surrounding medium is the highest, which is about 0.6%, followed by the radio frequency thawing mode with the glycerol solution, which is about 0.3%. There is no drip loss basically in a refrigerated thawing mode. Therefore, the three thawing modes mentioned above may not significantly affect the drip loss rates of the cuboid samples.

By analyzing cooking loss data of the cuboid samples after thawing, it can be seen that after freezing and thawing by respectively using the three thawing modes, i.e. the radio frequency thawing mode without surrounding medium, the radio frequency thawing mode with the glycerol solution and the refrigerated thawing mode, the cooking loss of the samples is significantly different from that of a fresh sample (33.1%). However, difference in cooking loss between the various thawing modes mentioned above is not significant, all ranging between 36.0% and 37.3%.

By analyzing total volatile basic nitrogen (TVB-N) content data of the cuboid samples after thawing, it can be seen that a TVB-N value of the sample is the highest after thawing by using the radio frequency thawing mode without surrounding medium, which is 13.2 mg/100 g. A TVB-N value of the sample is 11.9 mg/100 g after thawing by using the radio frequency thawing mode with the glycerol solution. A TVB-N value of the sample is the lowest after thawing by using the refrigerated thawing mode, which is 10.2 mg/100 g. Therefore, different thawing modes have little influence on the TVB-N value of the sample, and it is difficult to find a regular trend.

By analyzing superficial morphology and color difference data of the cuboid samples after thawing, it can be seen that overall color of the cuboid samples remains good after thawing by using the three different modes respectively. However, after thawing by using the radio frequency thawing mode without surrounding medium, there is a dark gray area at each of edge corners due to the edge corner energy concentration effect. The above situation does not exist in the radio frequency thawing mode with the glycerol solution and the refrigerated thawing mode.

Similarly, by analyzing drip loss rate data of the step body samples after thawing, it can be seen that a drip loss rate of the radio frequency thawing mode with the glycerol solution and that of the refrigerated thawing mode are low, which are 0.2% and 0% respectively. However, a drip loss rate of the radio frequency thawing mode without surrounding medium increases significantly, which is 0.7%. In a thawing process of the step body samples, compared with the cuboid samples, the drip loss rate of the step body sample thawed by using the radio frequency thawing mode without surrounding medium is significantly higher than that of the step body sample thawed by using the radio frequency thawing mode with the glycerol solution due to the significant edge corner energy concentration effect at thickness changing parts (namely the edge corners) and a large overheating area.

By analyzing the cooking loss data of the step body samples after thawing, it can be seen that cooking loss of a fresh sample is the lowest, which is 33.1%. After freezing and thawing by using the three thawing modes respectively, cooking loss of all the samples increases significantly. However, as for the sample thawed by using the radio frequency thawing mode without surrounding medium, cooking loss of a center and that of an edge corner are significantly different, which are 34.9% and 37.9% respectively. As for the sample thawed by using the radio frequency thawing mode with the glycerol solution or the refrigerated thawing mode, there is no significant difference in cooking loss of a center and that of an edge corner of the samples.

By analyzing total volatile basic nitrogen (TVB-N) content data of the step body samples after thawing, it can be seen that a TVB-N value of the fresh sample is the lowest, which is 12.1 mg/100 g. The radio frequency thawing mode with the glycerol solution and the refrigerated thawing mode have a great influence on the TVB-N value. A reason may be that thawing time of each of the two thawing modes mentioned above is longer than that of the radio frequency thawing mode without surrounding medium. However, different thawing modes have little influence on the TVB-N values of the samples, and it is difficult to find a regular trend.

By analyzing superficial morphology and color difference data of the step body samples after thawing, it can be seen that overall color of the step body samples also remains good after thawing by using the three different modes respectively. However, after thawing by using the radio frequency thawing mode without surrounding medium, there is a dark gray area at each of the thickness changing parts (namely edge corners). The above situation does not exist in the radio frequency thawing mode with the glycerol solution and the refrigerated thawing mode.

In the above thawing sample quality analysis experiment, based on the surrounding medium radio frequency heating experiment and the sample radio frequency thawing experiment, quality change of the cuboid samples and the step body samples under the three thawing modes, namely the radio frequency thawing mode without surrounding medium, the radio frequency thawing mode with the glycerol solution and the refrigerated thawing mode, was further researched, and quality difference in an edge corner and a center of each of the samples was emphatically compared. An experimental result shows that the quality of the sample may be significantly affected by the edge corner energy concentration effect caused by the radio frequency thawing mode without surrounding medium, especially the drip loss rate and a color difference value. The quality of the sample thawed by the refrigerated thawing mode is better, but the thawing time of the refrigerated thawing mode is longer. In contrast, the edge corner energy concentration effect caused by the radio frequency thawing mode without surrounding medium may be effectively alleviated by the radio frequency thawing mode with the glycerol solution. Meanwhile, not only may thawing time be significantly reduced, but also the quality of the sample may be basically same as that of the sample thawed by using the refrigerated thawing mode.

The above thawing sample quality analysis experiment, from a perspective of quality, proves that the radio frequency thawing mode with the glycerol solution can significantly shorten thawing time and achieve rapid uniform thawing on a premise of effectively ensuring the quality of the radio frequency thawing samples, especially for samples with irregular thickness.

Based on the surrounding medium radio frequency heating experiment, the sample radio frequency thawing experiment and the thawing sample quality analysis experiment mentioned above, it can be seen that, compared with the ethanol solution, the glycerol solution not only may effectively alleviate the edge corner energy concentration effect of the object to be heated in the radio frequency heating process, but also may further improve the quality of the sample after thawing, and further improve the thawing uniformity of the radio frequency thawing.

In addition, since the ethanol solution has defects such as flammability and volatility, the glycerol solution is easier to be used in industry than the ethanol solution.

In the radio frequency heating method according to the embodiments of the present application, by means of using the alcoholic solution as the surrounding medium to clad the object to be heated, the heating uniformity of the object to be heated in a radio frequency heating process may be improved, the edge corner energy concentration effect in the radio frequency heating process may be fully avoided, and then quality of the object to be heated after heating may be ensured. In particular, when the object to be heated refers to food to be thawed, quality of the food to be thawed after thawing may be improved by using the radio frequency heating method according to the embodiments of the present application. Not only may the edge corner energy concentration effect in regular food be overcome, but also a problem of uneven electromagnetic field distribution caused by uneven thickness of irregular food may be solved, thereby non-uniform heating to the irregular food may be avoided.

Figure 4:
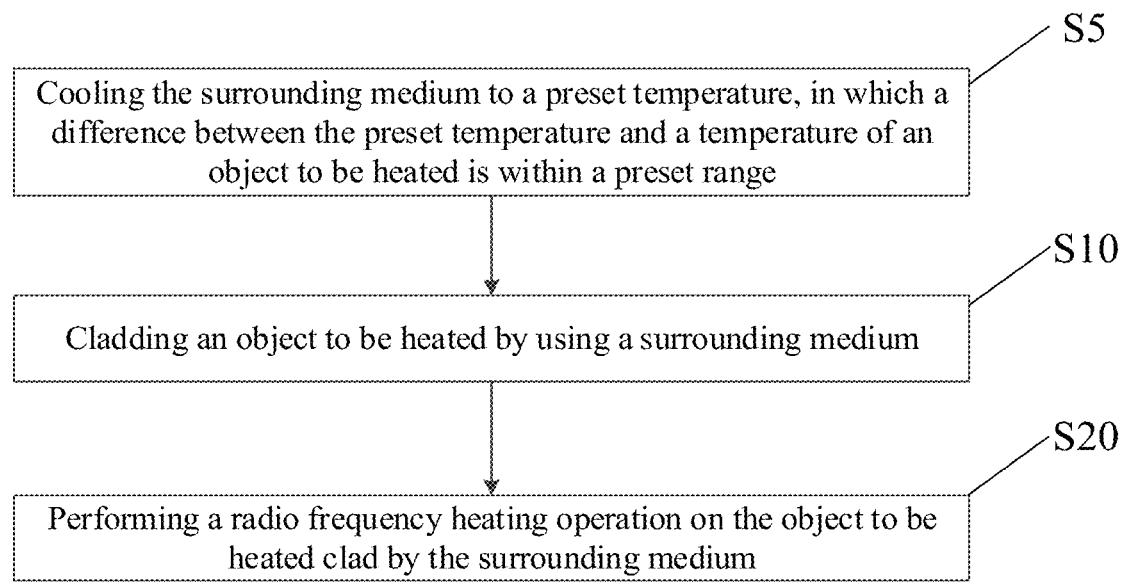
FIG. 4 shows a schematic flowchart of a radio frequency heating method according to another embodiment of the present application.

FIG. 4 shows a schematic flowchart of a radio frequency heating method according to another embodiment of the present application. The embodiment of the present application is extended based on the embodiment of the present application shown in FIG. 1. Differences between the embodiment of the present application and the embodiment shown in FIG. 1 are emphatically described below, and similarities may not be described repeatedly.

As shown in FIG. 4, compared with the embodiment shown in FIG. 1, the embodiment of the present application further includes the following step before step S10.

Step S5: cooling the surrounding medium to a preset temperature, in which a difference between the preset temperature and a temperature of an object to be heated is within a preset range.

It may be noted that the preset range may ensure that the preset temperature of the surrounding medium is close to the temperature of the object to be heated, so as to ensure that the surrounding medium may not interfere with a heating process of the object to be heated. For example, when the temperature of the surrounding medium is much lower than that of the object to be heated, a heating rate of the object to be heated may be affected by the low temperature surrounding medium.

The preset range can be set manually or calculated by a device such as a processor, which is not limited in the embodiments of the present application.

In the radio frequency heating method according to the embodiment of the present application, by means of cooling the surrounding medium to the preset temperature firstly, then cladding the object to be heated by using the surrounding medium, and performing the radio frequency heating operation on the object to be heated clad by the surrounding medium, an influence of the surrounding medium on the heating rate of the object to be heated may be fully reduced, and heating uniformity of the object to be heated may be further improved.

In an embodiment of the present application, the radio frequency heating method mentioned in the above embodiments of the present application is applied to a thawing process of frozen food. A specific radio frequency thawing working process includes: cooling a certain concentration of the ethanol solution (namely surrounding medium) to the same temperature as the frozen food, pouring the ethanol solution into a medium container which is not easy to be heated by radio frequency wave, immersing the prepackaged frozen food in the ethanol solution, and thawing the frozen food with the entire medium container and the ethanol solution by using a radio frequency heater.

In an embodiment of the present application, a cuboid polypropylene box with a size of 285*190*80 mm$^3$ is used, and an ethanol solution with a temperature of −30° C. And a concentration of 60% is poured into the box. A piece of fresh beef with an irregular shape of about 1.5 kg is frozen in a refrigerator at −30° C. for more than 24 hours until the whole sample reaches −30° C. The frozen beef is vacuum-packed with a polypropylene film and placed in the ethanol solution. The box is put into a Sairem Labotron 112® parallel plate radio frequency heater, and a spacing between plates is adjusted to 115 mm. Heating time is set to 5 minutes. After the heating operation is finished, the beef sample is taken out, and the package is removed. And then the beef sample is quickly moved to a FLIRSC60 infrared thermal imager for photographing temperature maps of a surface and a section, and a temperature distribution mean value and positive and negative deviation data representing thawing uniformity are calculated. According to the calculated temperature distribution mean value and positive and negative deviation data, it can be known that compared with the beef sample thawed by using radio frequency directly, without using the radio frequency heating method of the present application, under a same radio frequency thawing condition, unevenness of the sample after thawing is ±11° C. before using the radio frequency heating method of the present application, and the unevenness of the sample after thawing increases to ±3° C. after using the radio frequency heating method of the present application.

Similarly, in another embodiment of the present application, the ethanol solution with the concentration of 60% mentioned in the above embodiment is replaced with a glycerol solution with a concentration of 70%, and the same test is performed. According to a test result, it can be known that compared with a beef sample thawed by using radio frequency directly, without using the radio frequency heating method of the present application, under a same radio frequency thawing condition, unevenness of the sample after thawing is ±3° C. before using the radio frequency heating method of the present application, and the unevenness of the sample after thawing increases to ±2° C. after using the radio frequency heating method of the present application.

Figure 5:
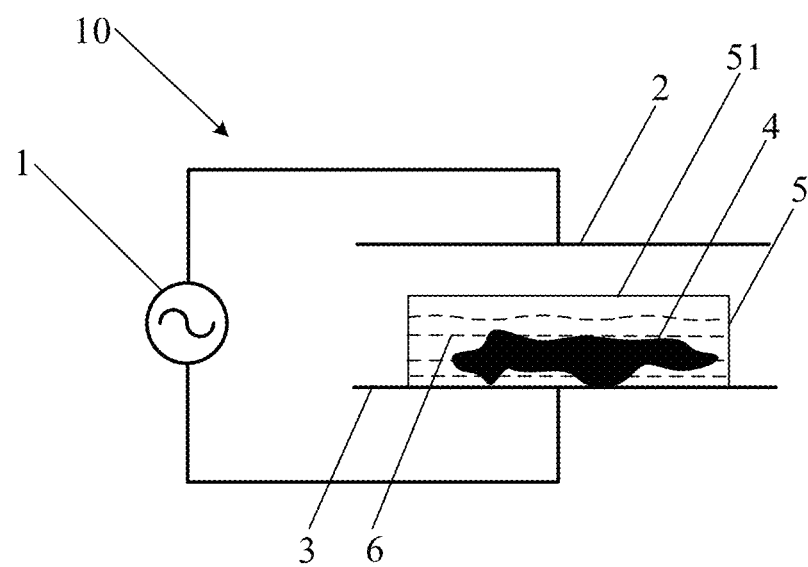
FIG. 5 shows a schematic practical application diagram of a radio frequency heating device according to an embodiment of the present application.

FIG. 5 shows a schematic practical application diagram of a radio frequency heating device according to an embodiment of the present application. As shown in FIG. 5, the radio frequency heating device according to the embodiment of the present application includes a radio frequency heater 10 and a medium container 5. The radio frequency heater 10 includes a radio frequency generator 1, an upper electrode plate 2 and a lower electrode plate 3. The radio frequency generator 1 is connected with the upper electrode plate 2 and the lower electrode plate 3 respectively. An opening 51 is formed on an upper end surface of the medium container 5 (an upper end surface in an orientation shown in FIG. 5). The upper electrode plate 2 and the lower electrode plate 3 are both flat structures, and a plane located by the upper electrode plate 2 is parallel to a plane located by the lower electrode plate 3. An orthographic projection of the upper electrode plate 2 and that of the lower electrode plate 3 are coincided. An accommodation space is provided between the upper electrode plate 2 and the lower electrode plate 3, and the medium container 5 is set in the accommodation space between the upper electrode plate 2 and the lower electrode plate 3.

In addition, a surrounding medium 6 is contained in the medium container 5, and the surrounding medium 6 is used to clad an object to be heated 4.

In an actual application process, firstly the object to be heated 4 is put into the medium container 5 through the opening 51 on the upper end surface of the medium container 5, so that the object to be heated 4 is clad by the surrounding medium 6 contained in the medium container 5. Then the opening 51 is closed, and the medium container 5 containing the object to be heated 4 and the surrounding medium 6 is put into the accommodation space between the upper electrode plate 2 and the lower electrode plate 3. And then the radio frequency generator 1 is started, and radio frequency wave is acted on the medium container 5 through the upper electrode plate 2 and the lower electrode plate 3. Radio frequency wave is further acted on the object to be heated 4 and the surrounding medium 6 in the medium container 5, thereby the object to be heated 4 is heated uniformly by using radio frequency wave.

In the radio frequency heating device according to the embodiment of the present application, by means of putting the object to be heated into the medium container containing with the surrounding medium, the object to be heated is surrounded by the surrounding medium. Thus, heating uniformity of the object to be heated is improved, and quality of the object to be heated is ensured after heating.

In addition, the radio frequency heating device according to the embodiment of the present application may rapidly and uniformly heat, including but not limited to thawing, a plurality of kinds of objects to be heated with different volumes and shapes. The radio frequency heating device has many advantages such as simple operation, wide applicability and low operating cost.

The medium container 5 may be made of Teflon and/or polypropylene. Since teflon and polypropylene have advantages such as food safety, easy cleaning, low dielectric loss and non-heating by radio frequency wave, the medium container 5 in the embodiments of the present application is made of Teflon and/or polypropylene.

Figure 6:
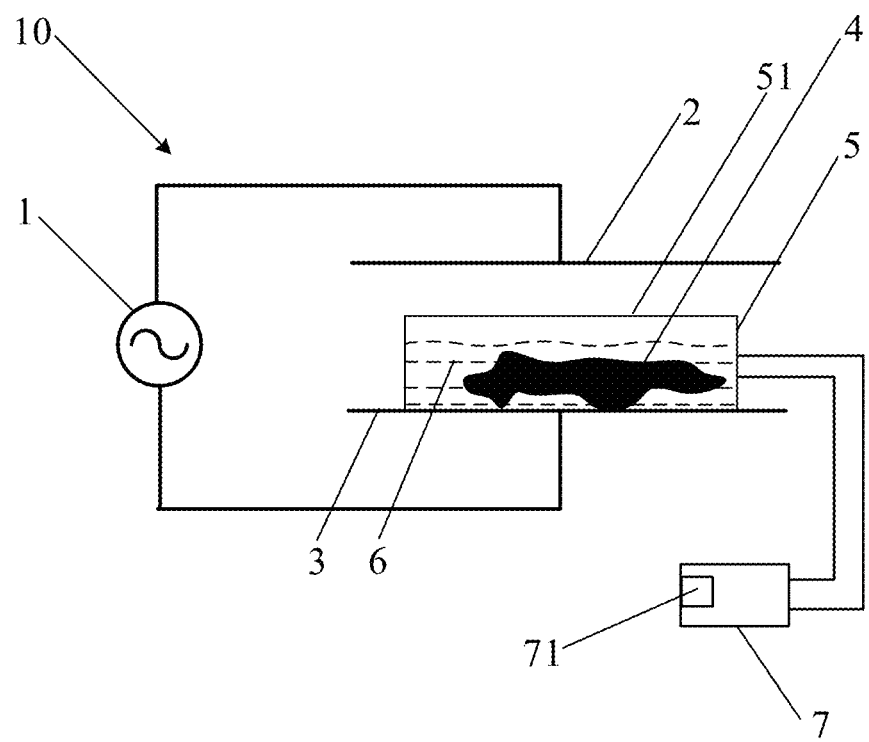
FIG. 6 shows a schematic practical application diagram of a radio frequency heating device according to another embodiment of the present application.

FIG. 6 shows a schematic practical application diagram of a radio frequency heating device according to another embodiment of the present application. The embodiment of the present application is extended based on the embodiment of the present application shown in FIG. 5. Differences between the embodiment of the present application and the embodiment shown in FIG. 5 are emphatically described below, and similarities may not be described repeatedly.

As shown in FIG. 6, the radio frequency heating device according to the embodiment of the present application further includes a heat exchanger 7 connected with a medium container 5. That is to say, the radio frequency heating device according to the embodiment of the present application includes a radio frequency generator 1, an upper electrode plate 2 and a lower electrode plate 3. The medium container 5 is set between the upper electrode plate 2 and the lower electrode plate 3, and the medium container 5 is filled with a surrounding medium 6. An opening 51 is formed on an upper end surface of the medium container 5 (an upper end surface in an orientation shown in FIG. 6). The opening 51 is used for taking and placing an object to be heated 4. The medium container 5 is connected with the heat exchanger 7, so that the surrounding medium performs temperature control cycling by using the heat exchanger 7. The heat exchanger 7 includes a temperature feedback system 71 for monitoring a temperature of the surrounding medium 6 and feeding the temperature back to the heat exchanger 7. The temperature of the surrounding medium 6 is controlled by the heat exchanger 7 according to feedback of the temperature feedback system 71.

In the radio frequency heating device according to the embodiment of the present application, the temperature of the surrounding medium 6 may be controlled by using the heat exchanger 7, thereby a premise condition for accurately controlling a heating temperature of the object to be heated is provided. Furthermore, the radio frequency heating device according to the embodiment of the present application further improves heating precision and heating uniformity of the object to be heated.

Figure 7:
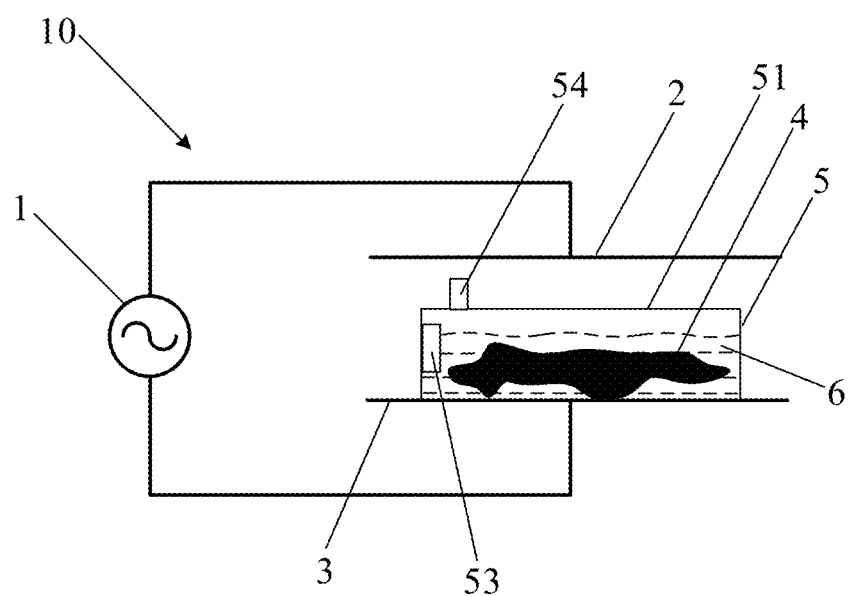
FIG. 7 shows a schematic practical application diagram of a radio frequency heating device according to still another embodiment of the present application.

FIG. 7 shows a schematic practical application diagram of a radio frequency heating device according to still another embodiment of the present application. The embodiment of the present application is extended based on the embodiment of the present application shown in FIG. 5. Differences between the embodiment of the present application and the embodiment shown in FIG. 5 are emphatically described below, and similarities may not be described repeatedly.

As shown in FIG. 7, in the embodiment of the present application, a liquid level sensor 53 is set on an inner wall of the medium container 5. The liquid level sensor 53 is used for detecting a liquid level of a surrounding medium 6 to ensure that an object to be heated (such as food to be thawed) is completely surrounded by the surrounding medium 6. In an actual application process, once the liquid level sensor 53 detects that the object to be heated is not completely surrounded by the surrounding medium 6, the liquid level sensor 53 sends warning information to indicate a requirement of supplementing the surrounding medium 6. An information type of the warning information includes, but is not limited to, alarm information, text information and so on.

A liquid injector 54 is set on an upper end surface of the medium container 5, and the liquid injector 54 is connected with the medium container 5. The liquid injector 54 is used for injecting the surrounding medium 6 into the medium container 5. The liquid injector 54 is signalling connected with the liquid level sensor 53. In an actual application process, once the liquid level sensor 53 detects that the object to be heated 4 is not completely surrounded by the surrounding medium 6, the liquid level sensor 53 sends an injecting signal to the liquid injector 54. The liquid injector 54 injects the surrounding medium 6 with an actual requirement amount into the medium container 5 according to the received injecting signal to supplement the surrounding medium 6. Thus, the object to be heated 4 is completely clad by the surrounding medium 6 may be ensured, and heating uniformity of the object to be heated 4 may be finally improved.

In a batch thawing process, the opening 51 of the radio frequency heating device may be opened directly and frozen food to be thawed may be put into the medium container 5 through the opened opening 51. After the frozen food to be thawed is put into the medium container 5, the opening 51 is closed and then the radio frequency generator 1 is turned on. The opening 51 is opened to take out the frozen food to be thawed after the thawing is completed.

Figure 8:
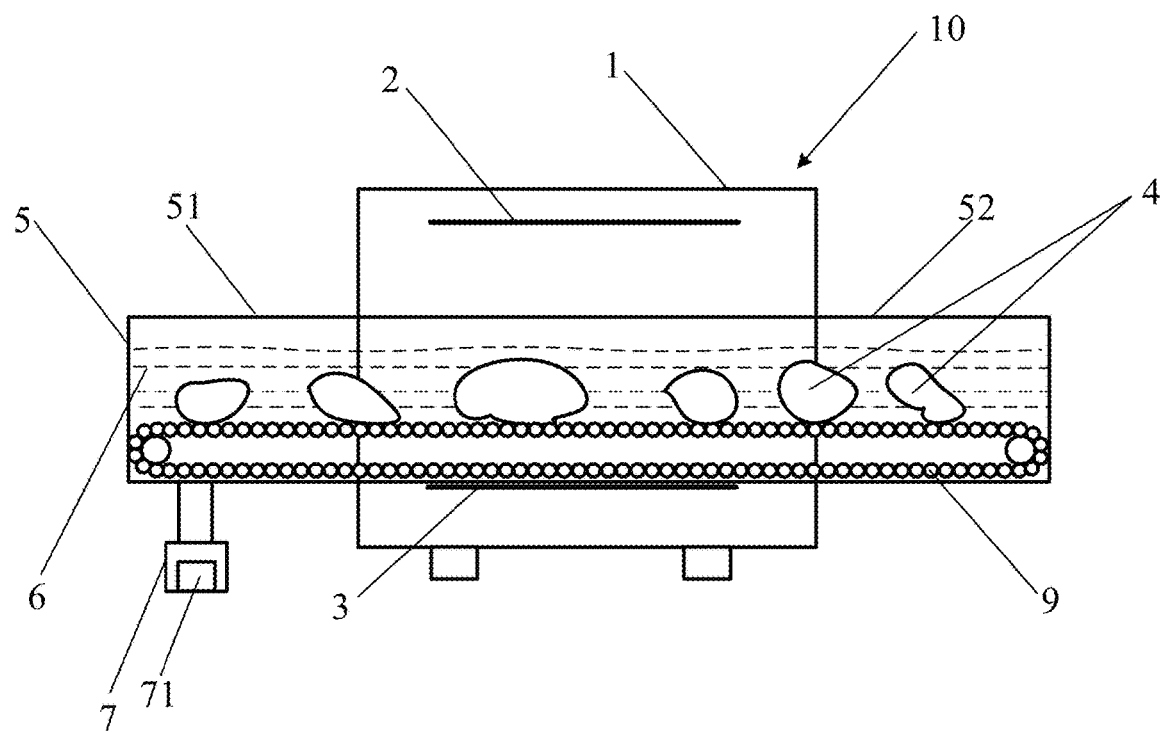
FIG. 8 shows a schematic practical application diagram of a radio frequency heating device according to yet still another embodiment of the present application.

FIG. 8 shows a schematic practical application diagram of a radio frequency heating device according to yet still another embodiment of the present application. The embodiment of the present application is extended based on the embodiment of the present application shown in FIG. 6. Differences between the embodiment of the present application and the embodiment shown in FIG. 6 are emphatically described below, and similarities may not be described repeatedly.

As shown in FIG. 8, the radio frequency heating device according to the embodiment of the present application is used in a continuous thawing process, and an object to be heated refers to food to be thawed. In the embodiment of the present application, a tunnel-type medium container 5 is provided in a radio frequency heater 10. The tunnel-type medium container 5 is disposed on a lower electrode plate 3. A first opening 511 and a second opening 512 are respectively set on both ends, along an extending direction, of an upper end surface of the medium container 5. In addition, a conveyer belt 9 is also disposed in the medium container 5. The extending direction of the medium container 5 is the same as a conveying direction of the conveyer belt 9. The conveying direction refers to a left-right direction in an orientation shown in FIG. 8.

In an actual application process, the conveying direction of the conveyer belt is limited as a left to right direction shown in FIG. 8. The food to be thawed with different shapes is put into the medium container 5 through the first opening 511 set on the upper end surface of the medium container 5 (an upper end surface in the orientation shown in FIG. 8), and conveyed to a radio frequency heating area, by using the conveyer belt 9, for thawing. After the thawing is completed, the food is conveyed to another end of the medium container 5 by using the conveyer belt 9, and the food after thawing is taken out through the second opening 512.

It may be noted that the conveying direction of the conveyer belt 9 may also refer to a right to left direction shown in FIG. 8. In this situation, the food to be thawed is put into the medium container 5 through the second opening 512 set on the upper end surface of the medium container 5, and conveyed to the radio frequency heating area, by using the conveyer belt 9, for thawing. After the thawing is completed, the food is conveyed to another end of the medium container 5 by using the conveyer belt 9, and the food after thawing is taken out through the first opening 511.

In addition, it may be noted that the number of openings can be set according to an actual situation, so as to further improve adaptability and broad application of the radio frequency heating device according to the embodiments of the present application. The number of openings is not limited in the embodiments of the present application.

In the radio frequency heating device according to the embodiments of the present application, by means of disposing the conveyer belt into the medium container, the medium container is provided with a tunnel-type conveying function, thereby the continuous thawing is realized. In other words, by using the radio frequency heating device according to the embodiments of the present application, the continuous thawing of a plurality of food to be thawed may be realized, thereby thawing efficiency may be significantly improved.

Figure 9:
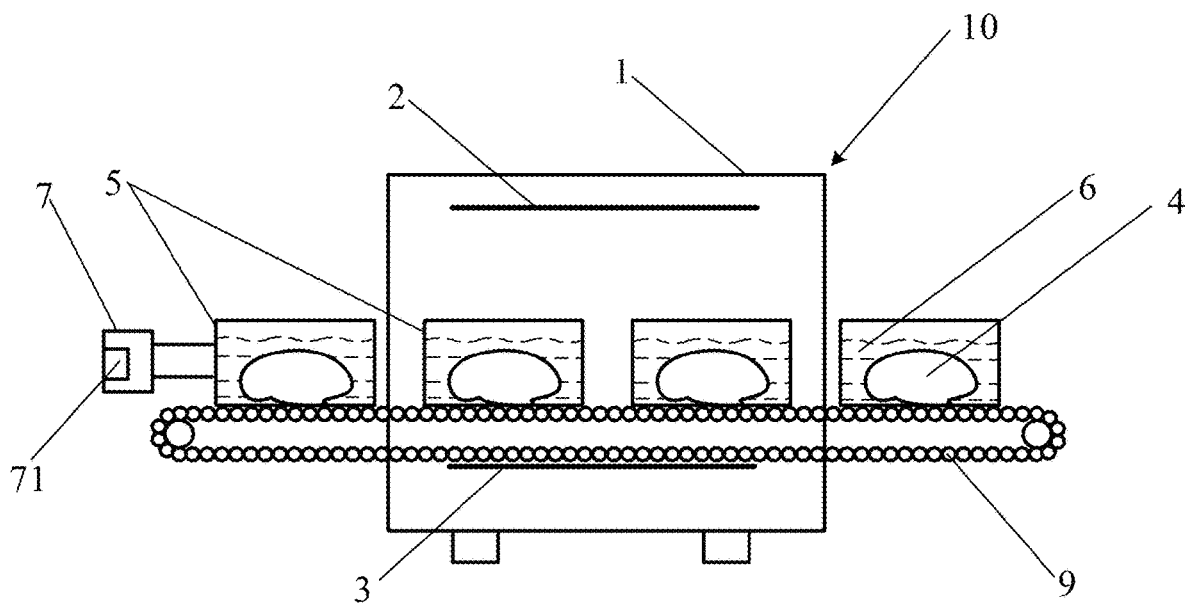
FIG. 9 shows a schematic practical application diagram of a radio frequency heating device according to yet still another embodiment of the present application.

FIG. 9 shows a schematic practical application diagram of a radio frequency heating device according to yet still another embodiment of the present application. The embodiment of the present application is extended based on the embodiment of the present application shown in FIG. 8. Differences between the embodiment of the present application and the embodiment shown in FIG. 8 are emphatically described below, and similarities may not be described repeatedly.

FIG. 9 shows another embodiment of continuous thawing provided by the present application. As shown in FIG. 9, a conveyer belt 9 is disposed on a lower electrode plate 3 in a radio frequency heater 10. A plurality of medium containers 5, filled with a surrounding medium 6, are disposed on the conveyer belt 9. Food to be thawed with different shapes is respectively put into the medium containers 5 at one end of the conveyer belt 9, and conveyed to a radio frequency heating area for thawing. After the thawing is completed, the medium containers 5 are conveyed to another end of the conveyer belt 9, and the food after thawing is taken out. The medium containers 5 and the surrounding medium 6 may be recycled for using.

It may be noted that whether each of the medium containers 5 is equipped with a heat exchanger 7 may be set according to an actual situation, so as to fully improve adaptability and broad application of the radio frequency heating device provided by the embodiments of the present application, which is not limited in the embodiments of the present application.

In the radio frequency heating device according to the embodiments of the present application, by means of disposing a plurality of medium containers on the conveyor belt, the food to be thawed may be thawed independently and continuously. Therefore, not only may thawing efficiency be ensured, but also a situation that the food to be thawed is infected by viruses or bacteria through the surrounding medium may be effectively avoided, thereby thawing safety may be improved.

In the above devices, an alcoholic solution may be selected as the surrounding medium. In the alcoholic solution, an ethanol solution may be used, and a glycerol solution is more preferably used. Advantages of using the ethanol solution or the glycerol solution have been fully demonstrated in the previous description referring to the method embodiments, and are not repeated here.

Although the present application has been described above by referring to the specific embodiments, those skilled in the art may understand that many modifications may be made to configurations and details disclosed in the present application within principles and scope disclosed in the present application. For example, although this specification takes food as an example to describe thawing methods, it is obvious that the thawing methods may also be applied to thawing other frozen objects other than food. The protection scope of the present application is determined by appended claims, and the claims are intended to cover all modifications included in the literal meaning or scope of equivalents of technical features in the claims.

In addition, the above are merely preferred embodiments of the present application, and are not used to limit the protection scope of the present application. Any modification, equivalent substitution, improvement, etc. made within the spirit and principles of the present application shall be included in the protection scope of the present application.

What is claimed is:

1. A radio frequency heating method, comprising:
    cooling a surrounding medium to a preset temperature, wherein a difference between the preset temperature and a temperature of an object to be heated is within a preset range;
    cladding the object to be heated by using the surrounding medium; and
    performing a radio frequency heating operation on the object to be heated clad by the surrounding medium, wherein the surrounding medium is an alcoholic solution.

2. The radio frequency heating method of claim 1, wherein the cladding an object to be heated by using a surrounding medium comprises:
    pouring the surrounding medium into a medium container, and putting the object to be heated into the medium container, so that the object to be heated is clad by the surrounding medium.

3. The radio frequency heating method of claim 2, wherein the performing a radio frequency heating operation on the object to be heated clad by the surrounding medium comprises:
    performing a heating operation, by a radio frequency heater, on the medium container containing the object to be heated and the surrounding medium.

4. The radio frequency heating method of claim 1, wherein a heating rate of the surrounding medium is lower than a heating rate of the object to be heated.

5. The radio frequency heating method of claim 1, wherein the surrounding medium is an ethanol solution.

6. The radio frequency heating method of claim 5, wherein a concentration of the ethanol solution is higher than 40%.

7. The radio frequency heating method of claim 1, wherein the surrounding medium is a glycerol solution.

8. The radio frequency heating method of claim 7, wherein a concentration of the glycerol solution is between 50% and 80%.

9. The radio frequency heating method of claim 8, wherein the concentration of the glycerol solution is 70%.

10. A radio frequency heating device, comprising: a heat exchanger connected with a medium container and configured to perform a temperature control cycling operation on a surrounding medium in the medium container to keep a difference between the preset temperature and a temperature of an object to be heated being within a preset range; and
    the medium container containing the surrounding medium configured to clad an object to be heated and a radio frequency heater configured to heat the medium container by radio frequency, wherein the surrounding medium is an alcoholic solution.

11. The radio frequency heating device of claim 10, wherein the heat exchanger comprises a temperature feedback system configured to monitor temperature data of the surrounding medium and feed the temperature data back to the heat exchanger.

12. The radio frequency heating device of claim 10, wherein the medium container comprises a liquid level sensor located on an inner wall of the medium container and configured to monitor a cladding situation of the surrounding medium on the object to be heated.

13. The radio frequency heating device of claim 12, wherein the medium container further comprises a liquid injector signalling connected with the liquid level sensor, the liquid injector is configured to inject the surrounding medium into the medium container and control an injecting amount of the surrounding medium according to monitoring data of the liquid level sensor.

14. The radio frequency heating device of claim 10, wherein the surrounding medium is an ethanol solution.

15. The radio frequency heating device of claim 14, wherein a concentration of the ethanol solution is more than 40%.

16. The radio frequency heating device of claim 10, wherein the surrounding medium is a glycerol solution.

17. The radio frequency heating device of claim 16, wherein a concentration of the glycerol solution is between 50% and 80%.

18. The radio frequency heating device of claim 17, wherein the concentration of the glycerol solution is 70%.

* * * * *